United States Patent [19]

de Boer

[11] 4,347,994
[45] Sep. 7, 1982

[54] MAGNETIC TAPE DRIVE ARRANGEMENT

[75] Inventor: Jacob de Boer, Eindhoven, Netherlands

[73] Assignee: U.S. Philips Corporation, New York, N.Y.

[21] Appl. No.: 202,035

[22] Filed: Oct. 29, 1980

[30] Foreign Application Priority Data

Nov. 26, 1979 [NL] Netherlands ........................ 7908559

[51] Int. Cl.³ ........................ G03B 1/04; G11B 15/32
[52] U.S. Cl. ........................................ 242/203; 318/7
[58] Field of Search ............................... 242/200–204, 242/206, 208–210; 226/188, 190; 360/71, 90; 318/6, 7

[56] References Cited

U.S. PATENT DOCUMENTS 3,032,286  5/1962  Herrmann ........................... 242/203
3,772,469 11/1973  Johnson ........................... 242/208 X
3,807,654  4/1974  Hall, Sr. ............................. 242/199

Primary Examiner—Leonard D. Christian
Attorney, Agent, or Firm—David R. Treacy

[57] ABSTRACT

A magnetic tape drive arrangement without pressure roller, having a signal generator which generates a signal T, derived from the capstan motor current and the capstan speed. The is proportional to the instantaneous torque exerted on the magnetic tape by the capstan, which signal T controls the supply and/or take-up motors in such a way that this signal is minimized, so that a slip-free magnetic-tape drive without pressure roller is possible.

5 Claims, 3 Drawing Figures

MAGNETIC TAPE DRIVE ARRANGEMENT

BACKGROUND OF THE INVENTION

The invention relates to a magnetic tape drive arrangement without pressure roller, which arrangement comprises a capstan,
a capstan drive motor,
a magnetic tape transport device for supplying and taking up a magnetic tape under tension along the capstan by means of at least one winding motor,
an energizing circuit, connected to the capstan motor, for driving the magnetic tape with the desired speed by means of the capstan,
a control signal generator for controlling at least the winding motor in such a way that the magnetic tape can be driven by the capstan without the tape slipping past the capstan, and
a motor current detector, which is connected to the control signal generator for detecting the current consumed by the capstan drive motor and for supplying a signal, which is proportional to said motor current, to the control signal generator.

Such a magnetic tape drive arrangement may inter alia be employed in audio and video tape recorders and is known from U.S. Pat. No. 3,807,654. This Patent states that, in order to prevent the tape from slipping past the capstan in a drive system without pressure rollers, the magnetic tape transport device should be controlled so that the capstan drive motor need not perform any work, the current consumption of the capstan drive motor being used as a control signal.

However, in this known arrangement very stringent requirements must be imposed on the friction between capstan and magnetic tape in order to prevent slip.

SUMMARY OF THE INVENTION

It is the object of the invention to improve a magnetic tape drive arrangement without pressure rollers so as to be less sensitive to variation in the capstan-tape friction.

In a drive arrangement according to the invention a reference source is connected to the control signal generator for supplying a reference signal which is proportional to the no-load current of the capstan drive motor, which reference signal is deducted from the signal supplied by the motor current detector; and an acceleration detector is connected to the control signal generator, for detecting the acceleration of the capstan and supplying an acceleration signal which is proportional to said acceleration and which is deducted from the signal supplied by the motor current detector.

In this respect winding motor is to be understood to mean both a feed motor and a take-up motor. The control signal may be applied either to the take-up motor or to the feed motor or to both motors.

In such a drive arrangement in accordance with the invention the control signal constitutes a better representation of the torque imparted to the magnetic tape by the capstan drive motor, especially during acceleration and deceleration. This improves the control of tape speed.

A first preferred embodiment of an arrangement in accordance with the invention may further be characterized in that the acceleration detector comprises a tachogenerator for supplying a signal which is proportional to the speed of rotation of the capstan drive motor and a differentiator for differentiating said signal.

A second preferred embodiment of an arrangement in accordance with the invention may further by characterized in that the acceleration detector comprises a circuit for measuring the e.m.f. generated in the capstan drive motor and a differentiator for differentiating the e.m.f.

BRIEF DESCRIPTION OF THE DRAWING

The invention will now be described in more detail with reference to the drawing, in which.

DESCRIPTION OF THE PREFERRED EMBODIMENT

Figure 1:
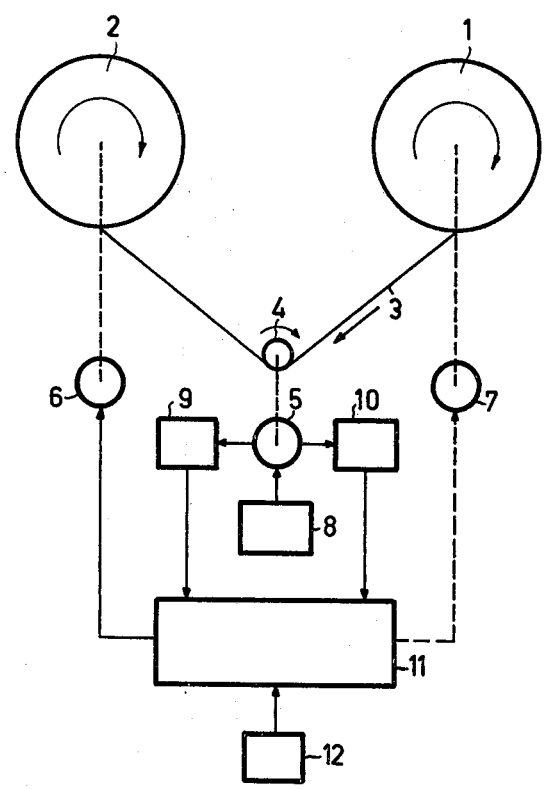
FIG. 1 is a schematic view which represents the basic construction of a magnetic tape drive arrangement without pressure rollers in accordance with the invention.

FIG. 1 represents the basic electrical circuit and drive parts of a magnetic tape drive arrangement without pressure rollers in accordance with the invention. The arrangement comprises a magnetic tape transport device with a take-up reel 2 driven by a take-up motor 6 and a feed reel 1 driven by a feed motor 7; of cpurse, the feed motor 7 is not always necessary and may be replaced by a braking device. This magnetic tape transport feeds the magnetic tape 3 along a capstan 4, which is driven by a capstan drive motor 5. For the stake of simplicity the recording and playback transducers co-operating with the magnetic tape 3 are not shown. These transducers may be stationary magnetic heads or rotary heads as frequently used in video tape recorders.

The capstan drive motor 5 is energized by an energizing circuit 8 in order to drive the magnetic tape 3 with the desired speed. For this purpose the motor 5 may be coupled to a tachogenerator, whose output signal is compared with a reference signal.

The arrangement further comprises a motor current detector 9, which detects the current consumed by the capstan drive motor 5, an acceleration detector 10, which supplies a signal which is a measure of the acceleration of the capstan 4, and a reference source 12.

The output signals of the detectors 9 and 10 and of the reference source 12 are supplied to a control signal generator 11, which supplies a control signal for controlling the speed of the take-up motor 6 and, as the case may be, for a feed motor 7. It is also possible to effect control by means of one feed motor only.

If the capstan 4 exerts a driving torque $T_d$ on the magnetic tape 3, then $T_d = T - T_o - T_v$, where T is the total torque produced by the motor 5, $T_o$ the zero-load torque representing the losses, and $T_v$ the accelerating torque. If the motor 5 is a d.c. motor, then $(T - T_o) = K_1 (I - I_o)$, where I is current consumed by the motor 5 and detected by the detector 9, $I_o$ is the zero-load current in the motor 5, which current is represented by the reference source 12, and $K_1$ is a constant. The accelerating torque $T_v$ satisfies the equation $T_v = J(d^2\phi)/(d_t^2)$, where J is the moment of inertia of the rotor and capstan 4 and $\phi$ the capstan phase; thus, $T_v = K_2 \cdot A$, where $K_2$ is a constant and A is the angular acceleration of the capstan 4.

The control signal generator 11 generates a signal proportional to $K_1(I-I_o)-K_2A$. By means of this signal the take-up motor is so controlled as to minimize this signal, so that the torque $T_d$ exerted on the tape 3 by the capstan 4 is minimal and the tape 3 can thus be driven by the capstan 4 without the use of a pressure roller and without the occurrence of slip.

Figure 2:
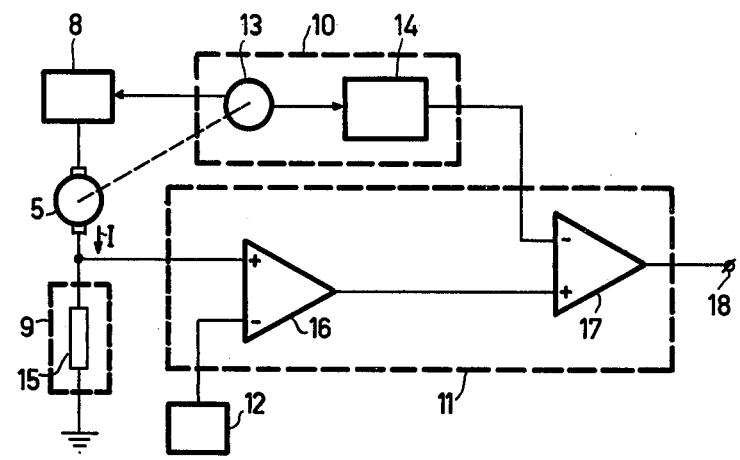
FIG. 2 is an electrical block diagram which shows the relevant parts 9, 10 and 11 of the arrangement of FIG. 1 in more detail for a first preferred embodiment.

FIG. 2 shows the relevant parts 9, 10 and 11 of a first embodiment of an arrangement in accordance with the invention in more detail. In this embodiment a tachogenerator 13—which may also serve as speed reference for the energizing circuit 8—is employed, which is coupled to the capstan motor 5. The acceleration detector 10 comprises this tachogenerator 13 and a differentiator 14, which derives a signal proportional to the angular acceleration of the capstan from the tachosignal. The constant factor $K_2$ may be realized either in this differentiator, or in a further circuit (for example a differential amplifier 17). The motor current detector 9 comprises a resistor 15, which is included in the motor supply line and which generates a voltage IR, in which R is the value of the resistor 15. The reference source 12 generates a voltage $I_oR$. The signal generator 11 comprises a differential amplifier 16, to which the voltages IR and $I_oR$ are applied, which differential amplifier may have a gain $K_1/R$ and then supplies a voltage equal to $K_1(I-I_o)$ as output signal. If desired, the factor $K_1$ may be generated in a further amplifier. The output signal of amplifier 16 and the output signal of differentiator 14 are applied to a differential amplifier 17, a voltage which is proportional to the desired signal $K_1(I-I_o)-K_2A$ appearing on the output 18 of said differential amplifier.

Figure 3:
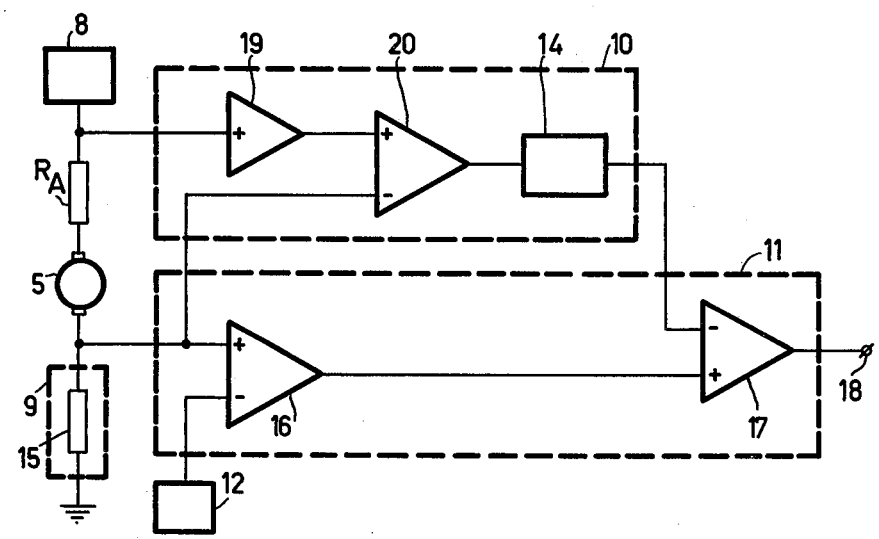
FIG. 3 is an electrical block diagram which shows the relevant parts 9, 10 and 11 of the arrangement of FIG. 1 in more detail for a second preferred embodiment.

FIG. 3 shows the relevant parts 9, 10 and 11 of a second embodiment of an arrangement in accordance with the invention in more detail. In this embodiment the back—e.m.f. E of the d.c. motor 5 is employed for detecting the angular acceleration A of the capstan, which acceleration is proportional to the time derivative of E with a constant factor $K_3$: $A=K(dE/3dT)$. A complication in this respect is the internal resistance $R_A$ of the motor 5.

Except for the acceleration detector 10 this embodiment is further identical to that of FIG. 2. The acceleration detector 10 comprises an amplifier 19, which measures the voltage across the motor 5 in series with the measuring resistor 15 and amplifies or attenuates this voltage by a factor $R/R_a$. The output voltage of this amplifier 19 and the voltage across resistor 9 are applied to a differential amplifier 20, so that the output signal of this amplifier is proportional to the e.m.f. E of the motor 5. This voltage is differentiated with a differentiator 14. If the amplifier 20 and/or differentiator 14 provide an amplification by a factor $(R_a \cdot K_2)/(R \cdot K_3)$, the output signal of amplifier 17 will be proportional to the desired signal $K_1(I-I_o)-K_2A$.

Apart from the embodiments described in detail, numerous modifications are possible in order to realize the desired function $K_1(I-I_O)-K_2A$ with differentiators and amplifiers etc. It is for example possible to differentiate the total voltage across the motor 5 and the resistor 15 with a differentiator and to differentiate the difference between the voltage across the resistor 15 and the reference voltage from the source 12 with another differentiator, and to take the difference of the two differentials, allowance being made for the correct factors.

In order to control the speed of the take-up motor 6, the signal from output 18 may be applied to an energizing circuit for the motor 6 and, as the case may be, applied in phase opposition to an energizing circuit for the feed motor 7. These signals, as the case may be with the inclusion of an additional control amplifier, should then be applied so that in the case of a positive signal on output 18—which corresponds to a positive torque Td exerted on the magnetic tape 3 by the capstan 4 the take-up motor will produce a greater torque and in the case of a negative signal on output 18 the take-up motor 6 will produce a smaller torque. For a correct choice of the constants $K_1$ and $K_2$ the magnetic tape can then be driven by the capstan without pressure roller and without the occurrence of slip.

In addition, the motor 6, and as the case may be the motor 7, may be connected to a separate control, known per se, for controlling the torque of said take-up motor 6 and any feed motor 7, in conformity with the amounts of tape on the reels 1 and 2.

What is claimed is:

1. A magnetic tape drive arrangement without pressure roller, which arrangement comprises:
   a capstan,
   a capstan drive motor,
   a magnetic tape transport device for feeding and taking up a magnetic tape under tension along the capstan by means of at least one winding motor,
   an energizing circuit, connected to the capstan motor, for driving the magnetic tape with the desired speed by means of the capstan,
   a control signal generator for controlling at least said winding motor in such a way that the magnetic tape can be driven by the capstan without slipping past the capstan, and
   a motor current detector, which is connected to the control signal generator, for detecting the current consumed by the capstan drive motor and for supplying a signal, which is proportional to said motor current, to the control signal generator, characterized by
   a reference source, which is connected to the control signal generator, for supplying a reference signal which is proportional to the no-load current of the capstan drive motor, which reference signal is deducted from the signal supplied by the motor current detector, and
   an acceleration detector, which is connected to the control signal generator, for detecting the acceleration of the capstan and supplying an acceleration signal, which is proportional to said acceleration and which is deducted from the signal supplied by the motor current detector.

2. An arrangement as claimed in claim 1, characterized in that the acceleration detector comprises a tachogenerator for supplying a speed signal which is proportional to the speed of rotation of the capstan drive motor and a differentiator for differentiating said speed signal.

3. An arrangement as claimed in claim 1, characterized in that the acceleration detector comprises a circuit for measuring the e.m.f. generated in the capstan drive motor and a differentiator for differentiating the e.m.f.

4. An arrangement as claimed in claim 2 or 3, characterized in that the control signal generator is adapted to generate the function $K_1(I-I_O)-K_2A$, where I is the current consumed by the capstan drive motor, $I_O$ is a reference value representing the zero-load current of the capstan drive motor, A is the capstan acceleration and $K_1$ and $K_2$ are constants.

5. An arrangement as claimed in claim 4, characterized in that the control signal generator comprises a first differential amplifier, to which the output signals of the motor current detector and the reference source are applied, and a second differential amplifier, to which the output signals of the first amplifier and the differentiator are applied.

* * * * *